(12) United States Patent
Weisenberg et al.

(10) Patent No.: US 12,459,214 B2
(45) Date of Patent: Nov. 4, 2025

(54) LINEAR PROPULSION MECHANISMS FOR THE MANUFACTURE OF MULTILAYER TUBULAR COMPOSITE STRUCTURES ON FORMING MANDRELS

(71) Applicant: SAFEGUARD LLC, Jacksonville, FL (US)

(72) Inventors: Kent Weisenberg, Jacksonville, FL (US); Ty Youmans, Yulee, FL (US)

( * ) Notice: Subject to any disclaimer, the term of this patent is extended or adjusted under 35 U.S.C. 154(b) by 171 days.

(21) Appl. No.: 18/236,026

(22) Filed: Aug. 21, 2023

(65) Prior Publication Data
US 2024/0059028 A1    Feb. 22, 2024

Related U.S. Application Data

(60) Provisional application No. 63/371,937, filed on Aug. 19, 2022.

(51) Int. Cl.
| | | |
|---|---|---|
| *B29C 70/32* | (2006.01) | |
| *B29C 70/54* | (2006.01) | |
| *B29L 23/00* | (2006.01) | |

(52) U.S. Cl.
CPC ............ *B29C 70/32* (2013.01); *B29C 70/545* (2013.01); *B29C 2793/009* (2013.01); *B29L 2023/00* (2013.01)

(58) Field of Classification Search
CPC .............................. B29C 70/32; B29L 2023/00
See application file for complete search history.

(56) References Cited

U.S. PATENT DOCUMENTS 3,130,104 A * 4/1964 Lewis ................. B29C 53/60
                                                       156/195
4,558,971 A * 12/1985 David ................. F16L 1/038
                                                       156/195

* cited by examiner

*Primary Examiner* — Jeffry H Aftergut
(74) *Attorney, Agent, or Firm* — Fleit Intellectual Property Law; Jon Gibbons

(57) ABSTRACT

The disclosed concept relates generally to a tubular composite structure for the intake, storage, and conveyance of gaseous or liquid media, including but not limited to hydrogen, hydrocarbons, and non-hydrocarbons, and related methods for manufacture. Provided is an internal wheeled drive mechanism for the precise and efficient on-site fabrication of the tubular composite structure.

37 Claims, 12 Drawing Sheets

LINEAR PROPULSION MECHANISMS FOR THE MANUFACTURE OF MULTILAYER TUBULAR COMPOSITE STRUCTURES ON FORMING MANDRELS

CROSS-REFERENCE TO RELATED APPLICATIONS

This application claims priority to U.S. Provisional Patent Application No. 63/371,937, filed 19 Aug. 2022, the contents of which IS incorporated herein by reference in its entirety.

FIELD OF THE INVENTION

The disclosed concept relates generally to a tubular composite structure for the intake, storage, and conveyance of gaseous or liquid media, including but not limited to hydrogen, hydrocarbons, and non-hydrocarbons, and related methods for manufacture. Provided is a wheeled drive mechanism for the precise and efficient on-site fabrication of the tubular composite structure.

BACKGROUND OF THE INVENTION

Certain flexible composite liners are currently in use both for gaseous pipelines and pipeline rehabilitation. Typically, these liners are prefabricated in a straight orientation and are spooled post-fabrication for transport to the jobsite on spools. This manufacture process leads to deficiencies, both in the diameter of the liner (generally limited to 10 inches or smaller), and in the requirement to introduce curvature post-fabrication which imposes limitations on the pressure that can be accommodated. In contrast, tubular composites disclosed herein are manufactured on-site, obviating the limitations imposed by transportation. These tubular composites can have a larger diameter, due to their onsite manufacture, unconstrained by transport restrictions. Furthermore, intrinsic curvature can be introduced into these tubular composites during on-site manufacture, which affords stronger tubes than can be obtained by bending or deforming a straight tube into a curved shape.

Multilayer tubular composite structures are suitable for use as gaseous pipelines or to remediate existing pipelines. Media contained within the tubular composite may consist of commercially or industrial important gases and liquids, including but not limited to hydrogen, hydrocarbon, and non-hydrocarbon. The tubular composite may be particularly valuable for gases and liquids relevant to renewable energy sources, including hydrogen, natural gas, natural gas/hydrogen mixtures, renewable natural gas, ammonia, and carbon dioxide. The media may be at ambient pressure or may be pressurized. The structure can be positioned either above ground, sub-terra, or sub-terra with multiple tiers of individual coils, and can be located at end-user industrial facilities such as hydrogen production facilities terminals, power plants, mining operations or data centers. The structure can be installed expeditiously and with materials and methodologies that afford a meaningful reduction in carbon emissions over existing technologies.

The tubular composite consists of one or more cannular assemblies disclosed herein, each composed of multiple concentric layers of sealing, reinforcement, sensing and monitoring components, pressure injected fluids, and over-molded structural and protection layers. The cannular assemblies are manufactured individually. In the case of two or more cannular assemblies in a single tubular composite, the first cannular assembly will form the exterior of the tubular composite, with each successive cannular assembly inserted in the interior of the tubular composite and pushed and/or pulled into place into the one or more existing, fully manufactured, cannular assemblies.

In a preferred embodiment of the tubular composite structure, each cannular assembly comprises the following layers, progressing outward: (a) a sealing layer, primarily responsible for resistance to leakage of media; (b) an axial reinforcement layer; providing strength in the axial (longitudinal) direction; and (c) a hoop reinforcement layer; providing strength in the circumferential direction. Variations on this basic design include multiples of one or more layers, particularly the hoop reinforcement layer, incorporation of devices for sensing and troubleshooting, either embedded in an existing layer or as a separate layer, a mesh-filled annulus for post-fabrication injection of resin, and an exterior protective layer, comprising a fiber reinforced material or an over-mold resin. The particulars for each tubular composite structure can be chosen to best meet the needs of a certain application.

The sealing layer is a functional layer installed and located on the innermost surface of each cannular assembly in the innervated tubular composite. The sealing layer provides watertightness, and acts as a redundant leak safeguard and for increasing the buckling resistance in the final cohesive composite structure. The sealing layers can provide an impermeable barrier to the material stored within the innervated tubular composite, and can be made from materials with specific resistance and non-adherence to the media being stored in the structure.

Sealing layers can be made from plastic sheet materials. By way of example only, the plastic sheet material can be chosen from ABS, PE, HDPE, UHMWPE, Nylon, PEEK, PET, PSS, PDA, ETFE polycarbonate, and polyurethane. By way of example only, the plastic sheet material for hydrogen transmission may be traditional or recycled and modified PET or Bio-based with polymeric nanocomposite with an organo-modified clay additive or graphene/graphene oxide or graphene derivatives. In certain embodiments, thinner fiber reinforced flat sheet feedstock material such as reinforced PEEK or Nylon or similar that has been pre-etched radially for corrugation or radially etched can be employed. In addition, the sealing layer can utilize recycled plastics, bio-based materials, and low emission materials as feedstock, which will significantly reduce the overall carbon footprint of the manufactures, their manufacture and the installation equipment and methodologies disclosed herein.

Each of the one or more cannular assemblies may be manufactured with the use of a cantilevered forming mandrel. The mandrel is designed so that a cannular assembly can be manufactured by applying the various cylindrical layers in sequence. Manufacture is initiated at the supported, or upstream, end of the mandrel with formation of the leading end of an innermost cylindrical layer, which envelops the mandrel. The leading end is then advanced down the mandrel, pulling the innermost layer, representing the growing cannular assembly, behind it. Various stations are located along the length of the mandrel, exterior to both the mandrel and the cannular assembly. At each station, a cylindrical layer is formed on the exterior of the existing layer which is outermost at that station. At each station, the newly formed cylindrical layer then becomes the outermost layer of the growing structure. The finished end of the cannular assembly is then dismounted from the mandrel at the unsupported, or downstream, end.

Proper operation of the forming mandrel will require critical control of the position and downstream motion of the nascent cannular assembly. Errors in either position or motion can lead to unacceptable flaws in the final assembly. For example, proper functioning of the hoop reinforcement layer requires precise application of material from helical winders surrounding the mandrel. Uneven motion of the assembly down the mandrel can lead to bare spots lacking helical reinforcement, which can give rise to spots on the finished assembly with inadequate strength, potentially resulting in catastrophic failure. Furthermore, certain applications envisioned for the tubular composite structure technology require the precise and controlled appointment of significant lengths of the structure into a desired location.

A winch connected to the proximal end of the structure can pull it forward and into position. However, as the length of the structure increases, reliance solely on the proximal winch becomes less favorable. The mass and therefore inertia will increase, resulting in an increase in pulling force required to maintain forward motion. Due to the nonuniform tension and nonzero elasticity of the structure, fluctuations in winch power or any retarding force such as friction can give rise to unwanted ripples of tension and distortion along the length of the structure. These wavelike ripples can become larger in magnitude and more erratic as the length increases.

These large and unpredictable ripples will negatively affect the manufacture of the structure, which requires precise control of the geometry of the nascent structure. Dislocation of the structure can cause misalignment of layers as they are applied, which can potentially give rise to nonuniform reinforcement and vulnerability to leakage or rupture. Strategies such as increasing safety margins or periodically slowing or halting appointment of the structure can lead to inefficiencies in both cost and time.

There remains a need for machines and related methods for appointing the tubular composite structure in a manner that improves positional control and reliability over the use of a single proximal winch.

SUMMARY OF THE INVENTION

These needs, and others, are met by equipping the forming mandrel with one or more internal wheeled drives, in order to apply downstream force to the nascent structure. Application of force at this location is optimal, since this location—the site of fabrication of the structure—is most vulnerable to dislocation of the structure, and will therefore most benefit from precise control of motion. By way of comparison, advancement of the nascent TCS solely by applying exterior force to the outer surface may lead to unwanted distortion or slippage in the various layers. Furthermore, the interior of the structure will provide a consistent and uniform surface for application of force by the worm gear on the mandrel, in contrast to the exterior, whose composition varies as the structure moves along the mandrel.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
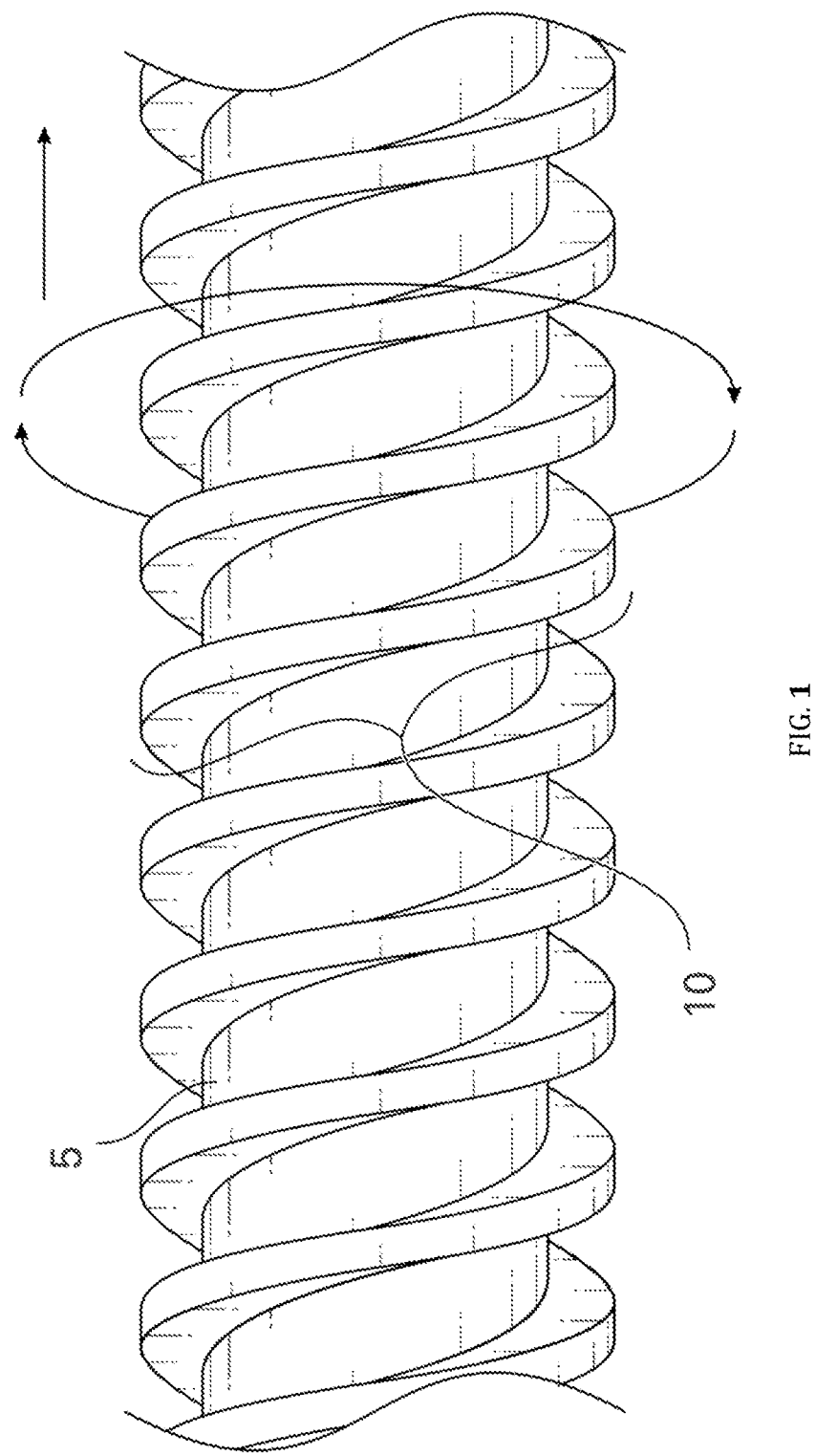
FIG. 1 depicts a typical worm gear.

Accordingly, provided herein, in a preferred embodiment, is a wheeled drive mechanism for a forming mandrel comprising:
- one or more drive wheels substantially interior to the mandrel,
- one or more outward-facing treads attached to the exterior of the one or more drive wheels, and
- one or more rotation mechanisms, wherein:
- each of the one or more treads is capable of contacting the internal surface of a nascent TCS on the exterior of the forming mandrel,
- the one or more rotation mechanisms are capable of rotating the one or more drive wheels relative to the forming mandrel, and
- rotation of the one or more drive wheels is capable of advancing a nascent TCS along the exterior of forming mandrel.

In some embodiments, the axes of each of the one or more drive wheels are concentric with the axis of the forming mandrel. In some embodiments, the wheeled drive mechanism comprises one or more worm gear drives.

Also provided herein, in a preferred embodiment, is a worm gear wheeled drive mechanism for a forming mandrel comprising:
- one or more cylindrical drive wheels concentric with the axis of the forming mandrel and interior to the forming mandrel,
- one or more outward-facing treads attached to the exterior of the one or more cylindrical drive wheels, and
- one or more rotation mechanisms, wherein:
- each of the one or more treads is capable of contacting the internal surface of a nascent TCS on the exterior of the forming mandrel,
- the one or more rotation mechanisms are capable of rotating the one or more drive wheels relative to the forming mandrel, and
- rotation of the one or more drive wheels is capable of advancing a nascent TCS along the exterior of forming mandrel.

In some embodiments, the worm gear wheeled drive mechanism comprises one or more helical treads attached to the exterior of each of the one or more cylindrical drive wheels.

In some embodiments, the worm gear wheeled drive mechanism comprises one or more thread assemblies attached to the exterior of the one or more drive wheels, each thread assembly comprising:
   a plurality of thread segments, and
   a mount attaching the plurality of thread segments to the cylindrical drive wheel.

In some embodiments, the plurality of thread segments of each thread assembly is located around a circumference of the cylindrical drive wheel. In some embodiments, the thread segments on a cylindrical drive wheel are arranged in a helical pattern.

In some embodiments, rotational motion of each thread assembly can be performed independently of the remaining thread assemblies. In some embodiments, rotational motion of each thread assembly is coupled with the remaining thread assemblies.

In some embodiments, the wheeled drive mechanism contains two cylindrical drive wheels. In further embodiments, the worm gear wheeled drive mechanism comprises one or more helical treads attached to the exterior of each of the two drive wheels. In further embodiments, the helical treads attached to the two drive wheels have opposite handedness.

In further embodiments, the plurality of thread assemblies on each of the two worm gear drives have opposite handedness.

In some embodiments, each of the plurality of thread assemblies contains a plurality of thread segments. In some embodiments, each of the plurality of thread assemblies contains a plurality of coplanar thread segments.

In some embodiments, the worm gear wheeled drive mechanism further comprises a support pipe, mounted internal to the cylindrical drive wheels and collinear with the forming mandrel. In some embodiments, the one or more rotation mechanisms are located inside the support pipe. In some embodiments, the one or more rotation mechanisms is located substantially in the interior of the support pipe. In some embodiments, the support pipe contains one or more openings that allow geared contact between a worm gear drive and a rotation mechanism. In some embodiments, the entirety of each of the one or more rotation mechanisms is located in the interior of the support pipe, with the exception of one or more gears, a section of each of which protrudes through an opening in the support pipe. In some embodiments, the motor of each of the one rotation mechanisms is located in the interior of the support pipe. In some embodiments, the worm gear drive further comprises one or more bearings between the cylindrical drive wheel and the support pipe. In some embodiments, the support pipe contains one or more openings that allow geared contact between a worm gear drive and a secondary gear.

In some embodiments, each of the one or more rotation mechanisms comprises a motor. In some embodiments, each of the rotation mechanisms comprises an electric motor. In some embodiments, each of the rotation mechanisms comprises a stepper motor.

In some embodiments, each of the one or more rotation mechanisms comprises one or more drive gears for rotating the cylindrical drive wheel. In some embodiments, each of the one or more rotation mechanisms comprises a single drive gear for rotating the cylindrical drive wheel. In some embodiments, the single drive gear is directly attached to the driveshaft of a motor.

In some embodiments,
   each of the one or more rotation mechanisms comprises a single drive gear for rotating the cylindrical drive wheel;
   each of the one or more rotation mechanisms comprises a secondary gear attached to the driveshaft of a motor; and
   the drive gear and the secondary gear make geared contact with each other.

In some embodiments, each of the one or more rotation mechanisms comprises:
   a motor;
   a plurality of drive gears for rotating the cylindrical drive wheel; and
   a set of one or more secondary gears, wherein
   the one or more secondary gears are capable of transmitting rotational power from the motor to the one or more secondary gears.

In some embodiments:
   the cylindrical drive wheel comprises an inward facing toothed ring; and
   the one or more drive gears make geared contact with the inward facing toothed ring.

In some embodiments, the mount attaching the plurality of thread segments to the cylindrical drive wheel is rigid. In some embodiments, the mount is capable of movement of the plurality of thread segments relative to the cylindrical drive wheel. In some embodiments, the mount is capable of radial movement of the plurality of thread segments relative to the cylindrical drive wheel. In some embodiments, the mount is a linear actuator.

In some embodiments, the axes of each of the one or more drive wheels are perpendicular to the axis of the forming mandrel.

Also provided herein, in a preferred embodiment, is an internal diameter drive ("IDD") wheeled drive mechanism for a forming mandrel comprising:
   one or more drive wheels, the axis of each of which is oriented perpendicular to the axis of the forming mandrel,
   an outward-facing tread attached to the exterior of each of the one or more drive wheels, and
   one or more rotation mechanisms, wherein:
   the tread of each of the one or more drive wheels is oriented so as to contact the internal surface of a nascent TCS on the exterior of the forming mandrel,
   the one or more rotation mechanisms are capable of rotating the one or more drive wheels relative to the forming mandrel, and
   rotation of the one or more drive wheels is capable of advancing a nascent TCS along the exterior of forming mandrel.

In some embodiments, the IDD further comprises two driveshafts, the axis of each of which is oriented perpendicular to the forming mandrel, and on either end of each of which is located a drive wheel. In some embodiments, the axes of the two driveshafts are directed vertically. In some embodiments, the axes of the two driveshafts are directed laterally. In some embodiments, a single rotation mechanism drives rotation of the two driveshafts, thereby rotating the four drive wheels relative to the mandrel. In some embodiments, the IDD comprises two rotation mechanisms, each of which drives rotation of one of the two driveshafts, thereby rotating the four drive wheels relative to the mandrel.

In some embodiments, the IDD further comprises two pairs of two collinear driveshafts, the axes of all of which are located perpendicular to the forming mandrel, and on the external end of each of which is located a drive wheel. In some embodiments, the four driveshafts are oriented horizontally. In some embodiments, the four driveshafts are oriented vertically. In some embodiments, the IDD comprises four rotation mechanisms, each of which drives rotation of one of the four driveshafts, thereby rotating the four drive wheels relative to the mandrel.

In some embodiments, each of the one or more drive wheels of the IDD has a bevel on the outward-facing surface. In some embodiments, the bevel on each of the one or more drive wheels comprises a tread of compressible material, oriented so as to contact the interior surface of the nascent TCS. In some embodiments, frictional engagement of the interior surface of the nascent mandrel with the tread on the bevel of each of the one or more drive wheels conforms the material to the interior surface.

In some embodiments, the IDD further comprises one or more guide wheels, the axis of each of which is located perpendicular to the forming mandrel, and each of which is oriented so as to contact the internal surface of a nascent TCS on the exterior of the forming mandrel. In some embodiments, each of the one or more guide wheels is radius-matched with the internal surface of the nascent TCS. In some embodiments, each of the one or more guide wheels is located approximately equidistant along the circumference of the forming mandrel from two drive wheels.

Also provided herein, in a preferred embodiment, is a method for manufacturing a cannular assembly, the method comprising the steps of:
  providing a mechanical forming mandrel having a fixed, upstream end and a cantilevered, downstream end;
  providing a wheeled drive mechanism as disclosed herein;
  forming a first circular leading end of a first cylindrical layer from a first feedstock on the surface of the mandrel at a first location near the fixed end;
  advancing the first circular leading end towards the cantilevered end;
  fabricating a growing first cylindrical layer from a feedstock on the surface of the mandrel behind the advancing first circular leading end, the first cylindrical layer thereby advancing with the first circular leading end towards the cantilevered end and becoming the outermost layer of a growing cannular assembly;
  performing one or more iterations of the following steps:
    forming a new circular leading end of a new cylindrical layer from a new feedstock, which may be the same or different from other feedstocks, on the outer surface of the advancing outermost layer of the incomplete cannular assembly at a downstream location, the existing outermost layer thereby becoming an inner layer of the growing cannular assembly;
    fabricating a growing new cylindrical layer from the new feedstock on the outer surface of the advancing outermost layer behind the advancing new circular leading end, the new cylindrical layer thereby advancing with the inner layers towards the cantilevered end and becoming the new outermost layer of the growing cannular assembly;
    optionally coating the outermost layer of the growing cannular assembly;
  severing, as needed, the growing cannular assembly from the feedstocks; and
  separating the completed cannular assembly from the cantilevered end, thereby providing the cannular assembly.

In some embodiments, the process of advancing the first circular leading end towards the cantilevered end is driven in part by the wheeled drive mechanism. In some embodiments, the process of advancing the first circular leading end towards the cantilevered end is completely driven by the wheeled drive mechanism. In some embodiments, the process of advancing the first circular leading end towards the cantilevered end is driven in part by an external winch.

Also provided herein, in a preferred embodiment, is a mobile onsite factory ("MOF") for fabrication of a tubular composite structure ("TCS"), comprising:
  a forming mandrel; and
  a wheeled drive mechanism for the forming mandrel comprising:
    one or more drive wheels substantially interior to the mandrel,
    one or more outward-facing treads attached to the exterior of the one or more drive wheels, and
    one or more rotation mechanisms, wherein:
      each of the one or more treads is capable of contacting the internal surface of a nascent TCS on the exterior of the forming mandrel,
      the one or more rotation mechanisms are capable of rotating the one or more drive wheels relative to the forming mandrel, and
      rotation of the one or more drive wheels is capable of advancing a nascent TCS along the exterior of forming mandrel.

Also provided herein, in a preferred embodiment, is a mobile onsite factory ("MOF") for fabrication of a tubular composite structure ("TCS"), comprising:
  a forming mandrel; and
  a wheeled drive mechanism as disclosed herein.

Also provided herein, in a preferred embodiment, is a mobile onsite factory ("MOF") for fabrication of a tubular composite structure ("TCS"), comprising:
  a forming mandrel; and
  a worm gear wheeled drive mechanism as disclosed herein.

Also provided herein, in a preferred embodiment, is a mobile onsite factory ("MOF") for fabrication of a tubular composite structure ("TCS"), comprising:
  a forming mandrel; and
  an internal diameter drive ("IDD") wheeled drive mechanism as disclosed herein.

Abbreviations

ABS=acrylonitrile butadiene styrene plastic; AMV=Autonomous Manufacturing Vehicle; ETFE=Ethylene tetrafluoroethylene; ID=inner diameter=inside diameter; MIG=metal inert gas welding; MOF=mobile onsite factory; OD=outer diameter=outside diameter; PDA=poly(diacetylene); PE=polyethylene; UHMWPE=ultra high molecular weight polyethylene; HDPE=high density polyethylene; LDPE=low density polyethylene; PEEK=Polyether ether ketone; PLA=poly(lactic acid); PLLA=poly(L-lactic acid); PPL=poly(polypropiolactone); PSS=poly(styrene sulfonate); SMAW=shielded metal arc welding; TCS=cannular composite structure; TDC=track drive carrier; TIG=tungsten inert gas welding; UHMWPE=Ultrahigh-molecular-weight polyethylene; UT=ultrasonic.

Definitions

The term "annulus", as used herein, alone or in combination, refers to a region between two concentric circles. The term "annular cylinder", as used herein, alone or in combination, refers to a region between two concentric cylinders. The term "interspatial annular cylinder", as used herein, alone or in combination, refers to an empty region between two concentric cylinders. In some embodiments, the interspatial annular cylinder can be filled with a liquid. In some embodiments, the liquid within an interspatial annular cylinder can then be cured, to form a solid, gel, or semi-solid.

The term "axial", as used herein, alone or in combination, refers to the direction parallel to a tube or cylinder. For the case of a nonlinear or coiled tube or cylinder, the term refers to the direction at a point on the tube or cylinder that is parallel to the tube or cylinder at that point.

The term "concentric", as used herein, alone or in combination, refers to two circular or cannular structures which share approximately the same center. The term "concentric" will also refer to two tubes which share approximately the same center, both of which tubes then form a coiled geometry. The term "eccentric", as used herein, alone or in combination, refers to two circular or cannular structures which do not share the same center.

The term "cylinder", as used herein, refers to the standard geometric definition of a prism with a circle at its base. It will be appreciated that some of the articles of manufacture described herein may be susceptible to forces, e.g., gravity, which distort the ideal cylindrical shape. The term "cylinder", as used herein, will also cover these articles of manufacture.

The term "cannular assembly", as used herein, alone or in combination, refers to an assembly of concentric tubes. In some embodiments, a cannular assembly comprises, from innermost surface to outermost surface: (b) an axial reinforcement layer, and (c) one or more hoop reinforcement layers. In some embodiments, a cannular assembly comprises, from innermost surface to outermost surface: (a) a sealing layer, (b) an axial reinforcement layer, and (c) one or more hoop reinforcement layers. In some embodiments, a cannular assembly comprises, from innermost surface to outermost surface: (b) an axial reinforcement layer, (c) one or more hoop reinforcement layers, and (d) a protective layer. In some embodiments, a cannular assembly comprises, from innermost surface to outermost surface: (a) a sealing layer, (b) an axial reinforcement layer, (c) one or more hoop reinforcement layers, and (d) a protective layer. In some embodiments, a cannular assembly further comprises one or more sensor array layers. In some embodiments, the axial layer in a cannular assembly comprises a Pd- or Pd-alloy coated tapered optical fiber. In some embodiments, one or more hoop reinforcement layers in a cannular assembly comprises a Pd- or Pd-alloy coated tapered optical fiber.

The term "radial", as used herein, alone or in combination, refers to a direction perpendicular to the centerline of a tube or cylinder. For the case of a nonlinear or coiled tube or cylinder, the term refers to the direction at a point on the tube or cylinder that is perpendicular to the tube or cylinder at that point.

The term "tubular composite structure" ("TCS"), as used herein, alone or in combination, refers to a structure containing one or more concentric cannular assemblies. In some embodiments, the TCS contains 1, 2, 3, 4, or 5 concentric cannular assemblies. The cannular assemblies may be the same or different. In some embodiments, the tubular composite structure comprises one or more interspatial annular cylinders between adjacent cannular assemblies.

The term "innervated tubular composite" ("ITC"), as used herein, alone or in combination, refers to a tubular composite structure contains one or more sensor array layers or one or more sensor wires. In some embodiments, the ITC contains one or more sensor array layers and one or more sensor wires. The ITC is therefore can provide telemetry on its condition to the user. In some embodiments, the ITC can report conditions chosen from structural integrity, internal pressure, presence of leaks, and extent of leakage.

The term "forming mandrel" or "mandrel", as used herein, refers to a horizontally oriented tube that is cantilevered, i.e., directly supported at only one end. The mandrel is manufactured so that a hoop or cylinder enclosing the mandrel at the supported end can pass down the length of the mandrel unobstructed to the unsupported end. A mandrel can be optionally solid, but is preferentially hollow. A mandrel can consist of a single monolithic structure. Alternatively, a mandrel can be composed of segments, one or more of which can optionally be translated and/or rotated relative to adjacent segments. A mandrel can be linear, or can assume a non-linear geometry. A mandrel composed of multiple segments can be articulated either actively, by powered drives located in the mandrel, or passively, via contact forces applied to the exterior of the mandrel.

The term "thread segment", as defined herein, refers to a segment of a helical thread. The exterior surface of the thread segment will comprise a tread, as defined herein. An individual helical thread, extending down an axis, can be subdivided into thread segments by removing certain sections of the thread down this axis. It will be appreciated that a worm gear composed of a plurality of thread segments will function similarly to a worm gear composed of a single unbroken thread.

The term "thread assembly", as defined herein, refers to a collection of thread segments located at a common position on the axis that defines the helices from which the thread segments are derived. By way of example, a double helix can be divided into one or more thread assemblies, each at a well-defined position on the axis, and each containing two thread segments (corresponding to the two helices). A triple helix can be divided into one or more thread assemblies, each containing three thread segments, and so forth.

The term "tread", as defined herein, alone or in combination, refers to a surface of an object with significant gripping ability with the interior surface of the TCS. In some embodiments, the friction between the tread of a drive wheel and the TCS is sufficient to afford slip-free advancement of the TCS down a forming mandrel. In some embodiments, the friction between the tread of a helical worm gear and the TCS is sufficient to afford advancement of the TCS down a forming mandrel, while allowing the tread to slip in the circumferential direction of the TCS. It will be understood that, in either case, the degree of slippage of the tread can be modulated by proper choice of material for the tread, as well as control of the outward (normal) force applied to the tread.

Sealing Layer

The sealing layers are functional layers installed and located on the innermost surface of each cannular assembly in the tubular composite structure. The sealing layers provide watertightness, and act as a redundant leak safeguard and for increasing the buckling resistance in the final cohesive composite structure.

Since the hoop reinforcement layer, described below, provides exterior reinforcement of the sealing layer, outward strain applied to the sealing layer due to internal fluid or gas pressurization during service the sealing layer is completely constrained from causing separation, damage, or rupture by the hoop reinforcement layer. The sealing layer material is therefore only subjected to compression, to which it has a high resistance. This design parameter ensures that any short term, long-term or transient loading on the sealing layer material and the seam is far below the material's physical properties thus eliminating any potential for separation, creep, cracking or rupture as well as significantly mitigating long term material fatigue.

The sealing layers can provide an impermeable barrier to the material stored within the tubular composite structure, and can be made from materials with specific resistance and non-adherence to the media being stored in the structure. Embodiments containing one or more cannular assemblies, each assembly containing a sealing layer on its innermost surface, are contemplated in this disclosure, depending on the required pressure resistance and/or the required number and types of flowable, and optionally curable, materials in the interspatial annular cylinder. The most internal sealing layer may also be constructed of materials that are highly hydrophobic or oleophobic to allow for the release of media when cleaning or batching different media to significantly reduce FAME and contaminants.

Individual sealing layers on different cannular assemblies can be made from different materials. Sealing layers can be made from plastic sheet materials. By way of example only, the plastic sheet material can be chosen from ABS, PE, HDPE, UHMWPE, Nylon, PEEK, PET, PSS, PDA, ETFE polycarbonate, and polyurethane. By way of example only, the plastic sheet material for hydrogen transmission may be traditional or recycled and modified PET or Bio-based with polymeric nanocomposite with an organo-modified clay additive or graphene/graphene oxide or graphene derivatives. In certain embodiments, thinner fiber reinforced flat sheet feedstock material such as reinforced PEEK or Nylon or similar that has been pre-etched radially for corrugation or radially etched can be employed. Methods disclosed herein may utilize highly reinforced plastics and metal sheet stock. Material for the sealing layer in the innermost cannular structure of the ITC may be chosen based on one or more of the following variables: cost, non-adherence, chemical or erosion resistance to the transmitted pipeline media, modulus for buckling resistance, and (when applicable) heat resistance to the application of cold spray metalizing and thermal processes or resistance to the pipeline media. Unlike current and lesser methods, and in consideration of the flat sheet feedstock methodology utilized in the materials and methods disclosed herein, the ability to utilize any material composition affords the capability to also utilize recycled plastics and bio-based materials, which will significantly reduce the overall carbon footprint of the manufactures, their manufacture and the installation equipment and methodologies disclosed herein. While the methods and manufactures disclosed herein retain the capability to use traditional petroleum polymerization derived materials such as HDPE or a hybrid of these traditional materials and recycled or bio-based materials, they can also utilize a high fraction of recycled, bio-based, and low emission materials. In some embodiments, recycled, bio-based, and low emission materials constitute 50% or more of the materials used in a method or manufacture. In some embodiments, recycled, bio-based, and low emission materials constitute 75% or more of the materials used in a method or manufacture. In some embodiments, recycled, bio-based, and low emission materials constitute 90% or more of the materials used in a method or manufacture.

By way of example, recycled, bio-based, and low emission materials that may be used in the methods and materials disclosed herein may include recycled materials such as polyethylene terephthalate (PET) plastic, including PET from recycled water bottles and other PET and similar recycled plastics and products. Additionally, bio-based materials that may be used in the methods and materials disclosed herein may include but are not limited to: PLA homopolymers (polylactic acid) and variants, such as PLLA, PPLA or "green" high density polyethylene. Many of these augmented bio-based and recycled materials have high dimensional stability, impact, moisture, alcohol and solvent resistance and often higher mechanical properties than their traditional petroleum-based counterparts. This makes them ideal for utilization in these tubular composite structures disclosed herein, and in turn be part of solution for carbon reducing and carbon neutral technologies. By example, the efficacy of carbon reductions made possible by the methods and manufactures disclosed herein, in only one mile of 12-inch diameter of ITC the entire structure ITC would utilize the recycled materials from nearly 3.5 million—12-ounce plastic water bottles or the sequestering of 20 tons of carbon dioxide in its manufacture. It should be noted again that, by design, all past and current storage systems cannot utilize these low carbon emission materials due to the "off the shelf" prefabricated cylinders or pipes that are used as the foundation of the processes, with recycled and bio-based compositions not being commercially available.

Axial Reinforcement Layer

The axial reinforcement layer is a functional layer, applied to the OD of the sealing layer in one or each cannular assembly in the ITC, imparting axial reinforcement and strength to the ITC to resist axial loading created by internal pressure.

The axial reinforcement layer can be made of any material that provides the required reinforcement. Individual axial reinforcement layers on different cannular assemblies can be made from different materials. By way of example only, the material can be chosen from para-aramid fiber, unidirectional fiberglass, carbon fiber, Kevlar, or HDPE fabric with or without pre-impregnated materials, such as epoxy, polyurethane, polyolefin, and EVA.

One or more of the axial reinforcement layers in an ITC may incorporate a sensor wire disclosed below, including but not limited to a Pd- or Pd-alloy coated tapered optical fiber.

Most generally, the axial reinforcement layer will be made of individual twisted or braided carbon fiber micro-ropes or twisted or braided carbon fiber graphene hybrid micro-ropes aligned sequentially into filaments and bonded to each other with EVA or similar resin. The micro-ropes can be fabricated out of carbon fiber tow or carbon fiber graphene materials from 5 k to 600 k which are twisted to a specific torsion and orientation to increase the alignment and the subsequent strength of the micro-rope and subsequently the filament by assuring each strand is subjected uniformly when under strain. These micro-rope filaments can be bonded together longitudinally with EVA resin to create a sheet fabric. These micro-rope filaments can be bonded together to form a filament or tape. This filament or tape can be uniformly distributed along the axis of the structure. The micro-ropes can comprise the EVA-impregnated material described above. The micro-ropes can be bonded together to form a filament or tape. Preferentially, for the curved ITC, filaments of this micro-rope material will be employed.

Hoop Reinforcement Layers

The hoop reinforcement layers of the tubular composite structure are functional reinforcement layers applied helically to encircle the axial reinforcement layer for providing high resistance to hoop stresses created in the tubular composite structure from internal pressure. This layer most typically will be made from twisted carbon fiber tow or twisted carbon fiber graphene hybrid (micro-ropes); however, unidirectional carbon fiber or glass fiber, Kevlar, aramid, preferably para-aramid, or polyethylene fibers can be used as an iteration of this embodiment. The hoop reinforcement layer Is wound over the axial reinforcement layer by way of external winders with storage spools. For applications that require additional hoop reinforcement, more than one hoop reinforcement layer can be incorporated into a cannular assembly. The more than one hoop reinforcement layers can be located adjacent or non-adjacent to each other. Preferably, a pair of hoop reinforcement layers located adjacent to each other will be wound with opposite handedness, e.g., one layer will be wound with a left-handed helix and the other layer will be wound with a right-handed helix.

One or more of the hoop reinforcement layers in an ITC may incorporate a sensor wire disclosed below, including but not limited to a Pd- or Pd-alloy coated tapered optical fiber.

Sensor Array Layers

The sensor array layers are one or more optional functional layers embedded within the ITC that can provide data acquisition capabilities for instantaneously reporting changes in, for example, temperature, pressure, flow, tension, fatigue, wall thickness, and/or corrosion, as well as other acoustic indicators such as movement like seismic events and approaching third-party activities. The embedded sensor array can provide continuous monitoring of the innervated tubular composite for structural health.

This sensor array layer most generally will consist of optical fibers for acoustic communication of data for the identification, classification, and overall health monitoring of the cannular structure while in service. The sensor array layer can be composed of optical fibers, communication cable, temperature, gas, and vibration sensors, chemical reaction sensors, and gas chromatography-mass spectrometry etc. for a variety of gas and liquid transmitted media. The sensor array layer can utilize discrete acoustic sensing devices combined with AI and ML classification and localization frameworks that allow for development of pattern recognition schemes for infrastructure security, faults, leaks, ruptures etc. The AI and ML fusion platform can afford remote simulated finite element analysis of the entire structure in real time for monitoring the health of the entire system.

In some embodiments, a sensor array layer is embedded on the exterior of a hoop reinforcement layer. In some embodiments, a sensor array layer is embedded on the exterior of an axial reinforcement layer. In some embodiments, a sensor array layer is located on the interior surface of a protective layer. In some embodiments, a sensor array layer is located on the exterior surface of the sealing layer.

Sensor Wires

The reinforcement materials in the innervated tubular composite also may contain an embedded sensor wire for facilitating additional monitoring and interrogation capabilities of the appointed cannular structure.

In some embodiments, the innervated tubular composite contains at least one sensor wire. In some embodiments, the sensor wire is embedded in an axial reinforcement layer. In some embodiments, the sensor wire is embedded in a reinforcement layer that comprises micro-rope. In some embodiments, the sensor wire is embedded in concave valleys formed between micro-ropes.

In some embodiments, the sensor wire will consist of a tapered optical fiber coated with Pd or a Pd alloy for detecting leaked hydrogen due to internal or external damage. These optical Pd fibers may be a single optical cable or may be embedded into the reinforcement fabrics of the composite cannular structure. Palladium has a high and selective affinity for hydrogen, and experiences a volumetric expansion that that is roughly proportional to hydrogen concentration. This hydrogenation of Pd not only induces a physical strain on the optical fiber but also changes the electronic configuration, resulting in a change in refractive index which can be monitored. Tapered optical fiber coated with Pd or a Pd alloy such as Pd/Ti improves safety by providing early notification of potentially dangerous concentrations of hydrogen. In some embodiments, concentrations of less than 100 ppm can be detected, allowing for leak remediation and/or isolation long before the lower explosive limit (LEL) is ever reached. Furthermore, sensors based on Pd-coated tapered optical fibers afford fast reporting times of less than 30 seconds, and by using Pd alloys, this can be reduced to less than 10 seconds.

Protective Layers

The protective layer is a functional layer applied on the exterior of the hoop reinforcement layer to provide protection of sensor array layer as well as all interior layers during the installation process. In one embodiment, this layer can be made of fiber reinforced high strength materials with high slip and abrasion resistant properties, including but not limited to nylon, tear-resistant PTFE coated fiberglass fabric, and polyethylene, depending on the application. The layer can be reinforced with aramid fabric, preferably para-aramid fabric. The layer can be impregnated with a high-slip coating. Inclusion of polyolefin or like compounds in a formulated composition can promote thermal shrinkage and compression of the protective layer during manufacture.

Alternatively, the protective layer may consist of an over-mold layer. The over-mold layer may consist of a material chosen from carbon fiber, Kevlar, aramid, preferably para-aramid, and fiberglass fabric. In some embodiments, the material may be impregnated with a UV or heat cured resin.

Forming Mandrel

Also provided herein, in an exemplary embodiment, is a cantilevered forming mandrel for the manufacture of a tubular composite structure.

In some embodiments, the mandrel is monolithic. In some embodiments, the mandrel comprises a plurality of segments positioned successively from the supported, upstream end to the unsupported, downstream end. In some embodiments, the segments are substantially cylindrical in shape.

In some embodiments, the mandrel is substantially linear. In some embodiments, the mandrel is substantially curved. In some embodiments, the curvature of the mandrel can be varied. In some embodiments, the mandrel can be varied between curved geometries of different radii of curvature. In some embodiments, the mandrel can be varied between curved geometries of different radii of curvature during manufacture of the ITC. In some embodiments, the mandrel can be varied between linear and curved.

In some embodiments, the exterior of the mandrel is substantially cylindrical in shape. In some embodiments, the exterior of the mandrel is substantially the shape of toroidal segment.

In some embodiments, the mandrel is solid or, alternatively, is composed of solid segments.

In some embodiments, the mandrel is hollow or, alternatively, is composed of hollow segments.

In some embodiments, one or more pairs of adjacent segments in a segmented mandrel is connected with hinges. In further embodiments, all pairs of adjacent segments are connected with hinges.

In some embodiments, the hinges allow the individual segments in each pair of adjacent segments to translate and/or rotate relative to each other. In some embodiments, the hinges allow the individual segments in each pair of adjacent segments to translate and/or rotate relative to each other in the horizontal plane. In some embodiments, the hinges allow the individual segments in each pair of adjacent segments to rotate relative to each other in the horizontal plane.

In some embodiments, one or more pairs of the adjacent segments that are connected with hinges are further fitted with machinery to drive the translation and/or rotational motion.

In some embodiments, all of the pairs of adjacent segments that are connected with hinges are further fitted with machinery to drive the translation and/or rotational motion.

In some embodiments, none of the pairs of adjacent segments that are connected with hinges are further fitted with machinery to drive the translation and/or rotational motion.

The dimensions of the mandrel will be determined by the nature of the tubular composite to be manufactured. The OD of the mandrel is the same or approximately the same as the desired ID of the tubular composite to be manufactured. Preferably, the OD of the mandrel can be adjusted to suit the on the required design of the cannular assembly. The length of the mandrel is determined by the number and size of the various stations, which in turn is determined by the makeup of the tubular composite.

Worm Gear Mechanism

In some embodiments, the worm gear mechanism disclosed herein can propel a cylindrical layer of material, such as the sealing layer on a nascent cannular assembly, along a forming mandrel. The worm gear mechanism comprises one or more worm gear drives which are positioned concentric with the axis of the forming mandrel. Each worm gear drive comprises a worm gear, described in detail below. In a preferred embodiment, the worm gears comprise thread segments arranged in helices in place of continuous helical threads. In a preferred embodiment, the depth of the thread segments, and thus the relative position of the thread segments and the mandrel, can be adjusted with linear actuators which can drive thread segments in the radial direction. Preferably, rows of individual thread segments are grouped together to provide thread assemblies, with each thread assembly capable of moving in the radial direction.

The thread segments on the surface of the worm gear can make contact with the inner surface of the cylindrical layer of material. The contact force can be modulated by varying the depth of the thread segments, either with an individual linear actuator for each segment, or with a linear actuator for each thread assembly, each of which comprises a plurality of thread segments. Linear propulsion is accomplished by rotating the worm gear around the centerline. Alternatively, the thread segments can be sufficiently retracted from the interior surface of the cylindrical layer of material to allow its unhindered passage down the mandrel.

A depiction of a typical worm gear is provided in FIG. 1. The worm gear consists of cylindrical drive wheel 5 and raised helical thread (or threads) 10. The worm gear can vary in several aspects, including but not limited to length and radius of the cylindrical drive wheel 5, thickness, depth, and pitch of threads 10. The worm gear depicted in FIG. 1 is a 2-start worm gear, i.e., the threads consist of two interleaved helical ridges. Rotation of the worm gear around its centerline can produce motion in an external component, most typically in a teethed worm wheel, or gear.

In principle, rotation of a worm gear in contact with the inner surface of a concentric cylinder can induce linear motion by the cylinder. In practice, many factors may influence the efficiency of this operation. The worm gear can apply rotational torque on the cylinder, thereby causing the cylinder to rotate. In an extreme case, the rotating worm gear might grip the interior of the cylinder and induce paired rotation of both worm gear and cylinder, with no linear motion.

For example, the worm gear depicted in FIG. 1 has right-handed helicity; rotation of the gear in the sense indicated by the circular arrow will tend either to (a) advance a cylinder enclosing and in contact with the gear to the right, (b) rotate the cylinder in the same direction, or (c) both.

Preferably, linear motion can be accomplished by employing a pair of worm gears with opposite helicity. Each of the pair of worm gears will be rotated in opposite senses i.e. clockwise and counterclockwise, to achieve the desired forward motion. The torques applied by each of the contra-rotating worm gears will cancel, thereby resulting in net forward motion.

Figure 2:
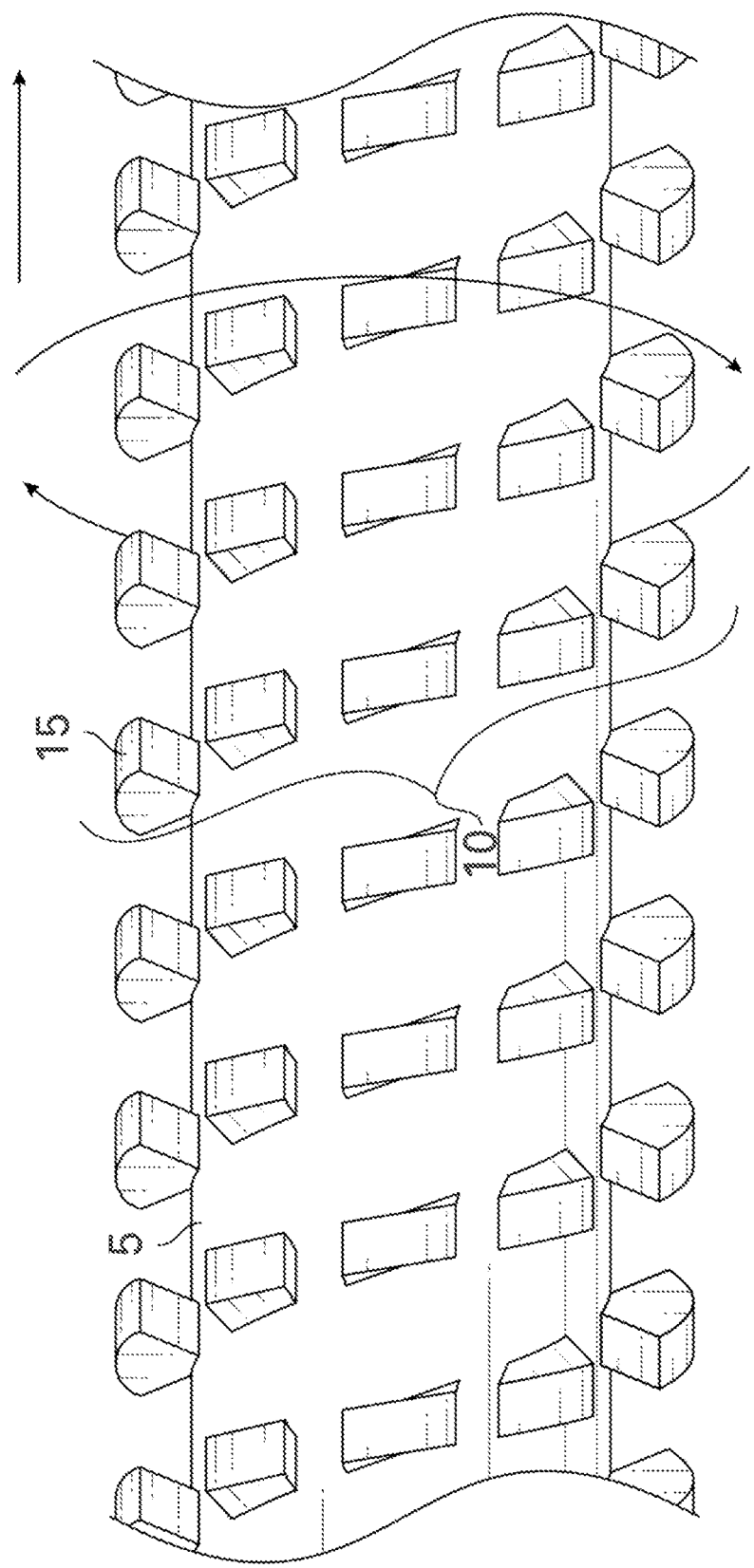
FIG. 2 depicts a worm gear with segmented threads in place of continuous threads.

An alternative to the worm gear design of FIG. 1 is provided in FIG. 2. Each individual helical thread 10 has been replaced with a segmented thread. Stated differently, each complete turn of the solid thread of the gear in FIG. 1 has been replaced with eight individual thread segments 15, positioned at 45° intervals around the circumference. Rotation of the worm gear will also tend to drive lateral motion of an enclosing cylinder. Advantageously, each thread segment 15 in the worm gear of FIG. 2 can be moved radially, i.e., extended away from, or retracted towards, the centerline of the shaft. This operation is not easily feasible in the worm gear of FIG. 1, due to the rigidity of the helical thread.

Figure 3:
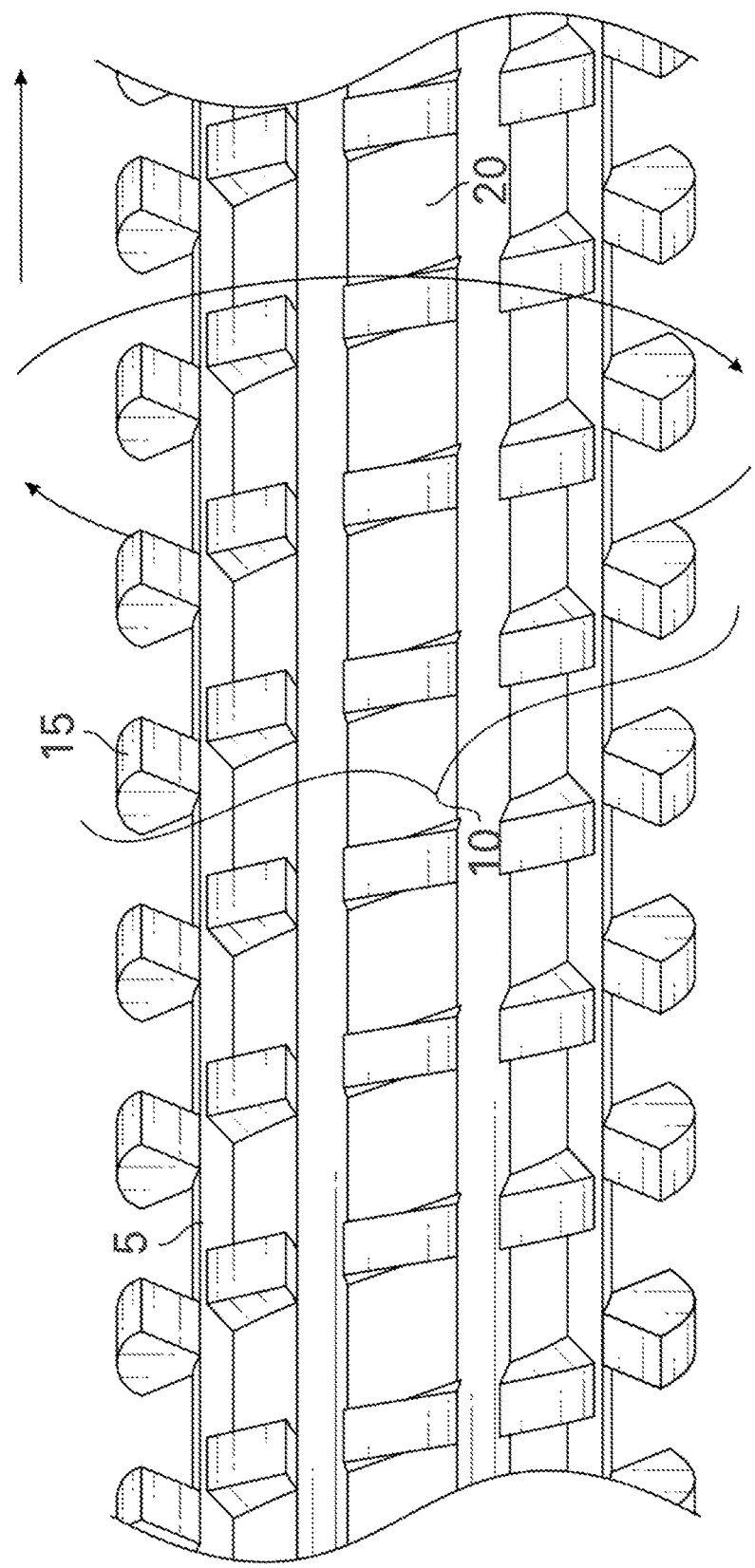
FIG. 3 depicts a worm gear with thread segments grouped into thread assemblies.

A variation of the worm gear design of FIG. 2 is provided in FIG. 3. The design retains cylindrical drive wheel 5 and thread segments 15 of FIG. 2. Collinear thread segments are grouped into thread assemblies 20. Radial motion can be accomplished by driving individual thread assemblies 20 outward from the centerline.

Figure 4:
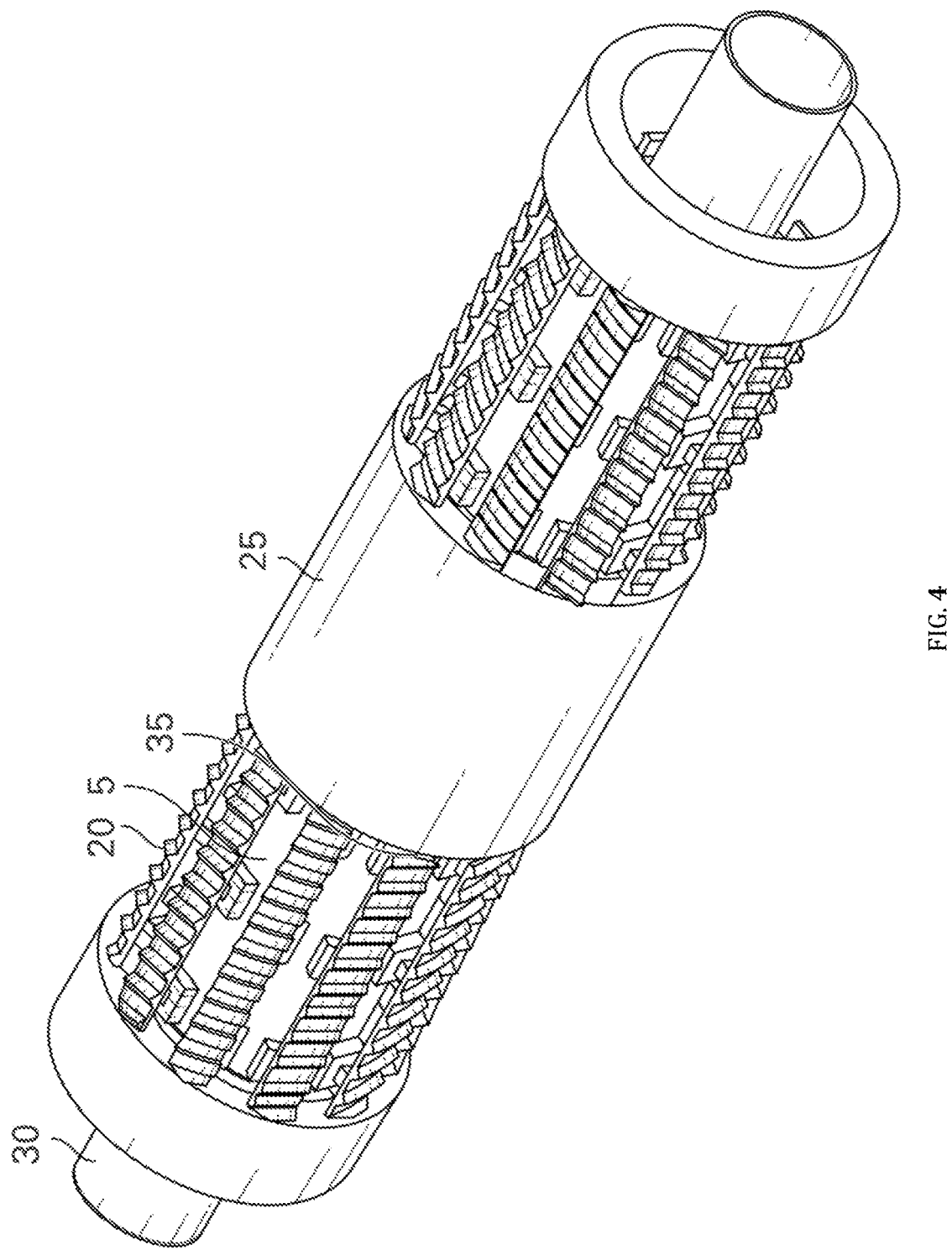
FIG. 4 depicts a perspective of an embodiment of a mechanism comprising both a forming mandrel and the worm gear mechanism of the current disclosure.

A perspective of an embodiment of a mechanism comprising both forming mandrel and worm gear mechanism is depicted in FIG. 4. Optional support pipe 30 is stationary and concentric with the mechanism, and can provide support to forming mandrel 25. As with forming mandrel 25, support pipe 30 is generally cantilevered, i.e., supported at only one end, in order to allow the nascent cannular assembly to traverse the mandrel and dismount the mandrel at the unsupported end in finished form. Not shown is the cylindrical sealing layer, which is generally the interior layer of the cannular assembly, and which makes contact with the exterior of both the forming mandrel and the worm gear drive(s).

In this depiction of the embodiment, the cylindrical forming mandrel 25 is interrupted in two places by worm gear drives, comprising thread assemblies 20 attached to cylindrical drive wheel 5 via linear actuators 35. Use of multiple thread assemblies 20 around the circumference, each mounted on linear actuator 35, allows for a combined radial motion of the segments in a way that is not possible in assemblies that use a single, completely toroidal worm gear. The worm gear drives encircle the entire circumference of the mechanism, thereby allowing for free rotation of the assembly, and also requiring that the mandrel be divided into segments. In this depiction, with the configuration of linear actuators 35 as shown, the thread segments are at approximately the same depth as the surface of the forming mandrel, and are therefore situated to grip the interior of sealing layer 65 as it traverses the forming mandrel.

Figure 5:
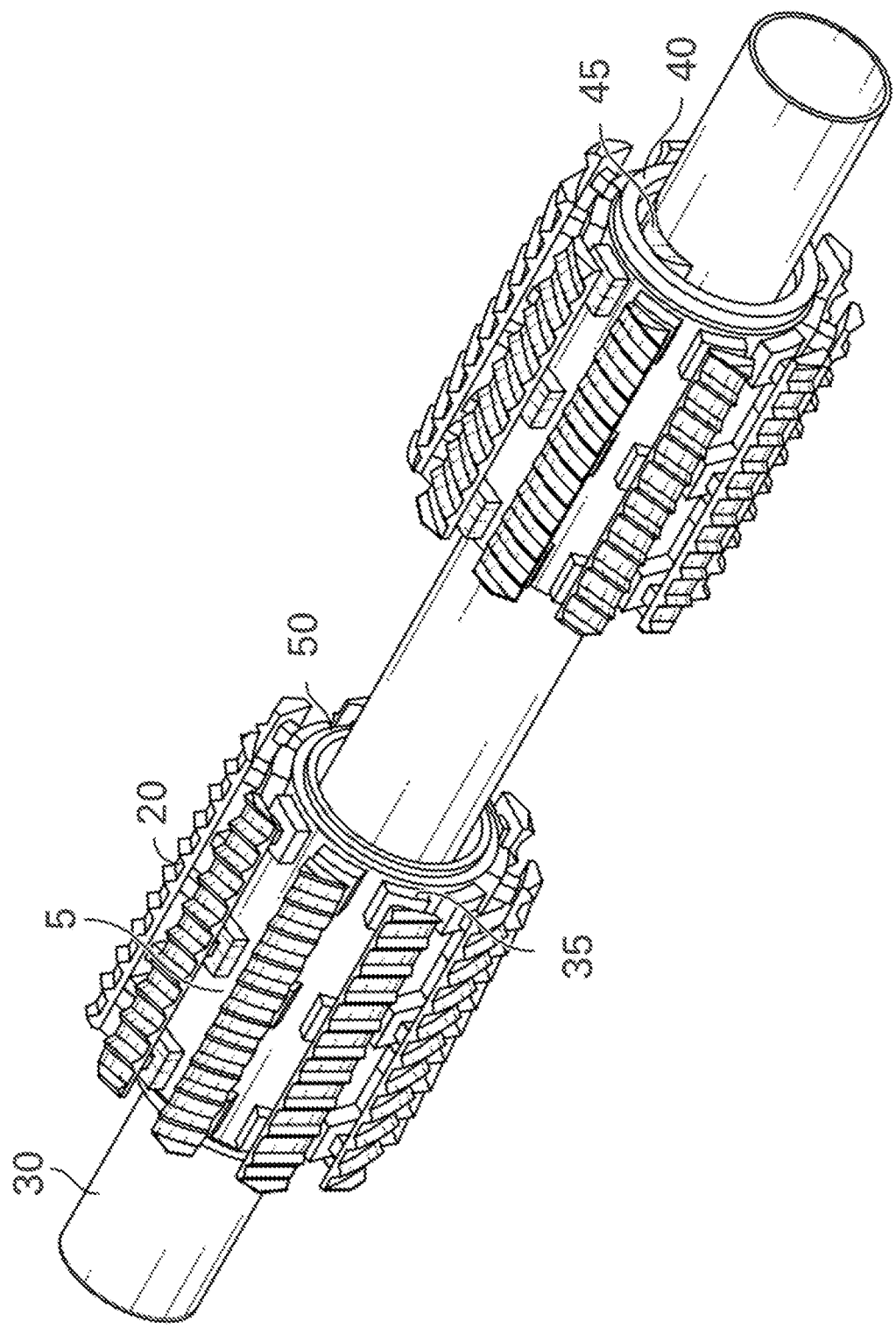
FIG. 5 depicts a perspective of an embodiment of the worm gear mechanism of the current disclosure with mandrel removed.

Provided in FIG. 5 is the same perspective as FIG. 4, with forming mandrel 25 removed for clarity. On the interior of cylindrical drive wheel 5 is attached ring 40 with inward-pointing teeth. Toothed ring 40 makes contact with drive gear 45. In this embodiment, drive gear 45 protrudes through an opening in support pipe 30. Also shown in this depiction is optional electrical slip ring 50, providing power for linear actuators 35.

Figure 6:
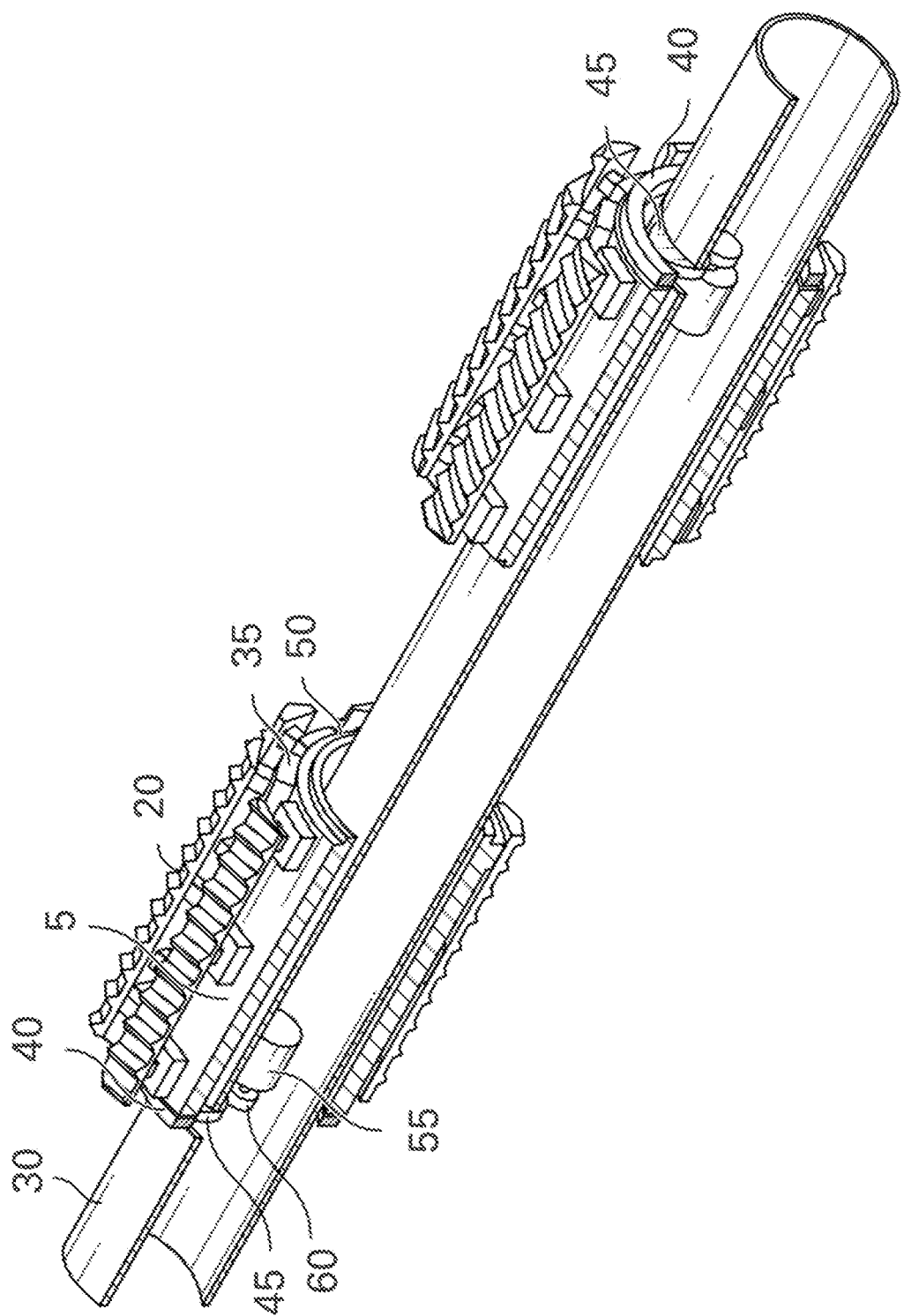
FIG. 6 depicts a cross-section of an embodiment of the worm gear mechanism of the current disclosure.

Provided in FIG. 6 is the same perspective as FIG. 5, with a cutaway to show the drive components. Motor 55 in the interior of support pipe 30 provides mechanical power to drive circular motion of cylindrical drive wheel 5. In this embodiment, torque is provided to drive gear 45 via secondary gear 60 mounted on the driveshaft of motor 55. Also in this embodiment, toothed ring 40 and slip ring 50 are mounted on opposite sides of the mechanism.

Figure 7:
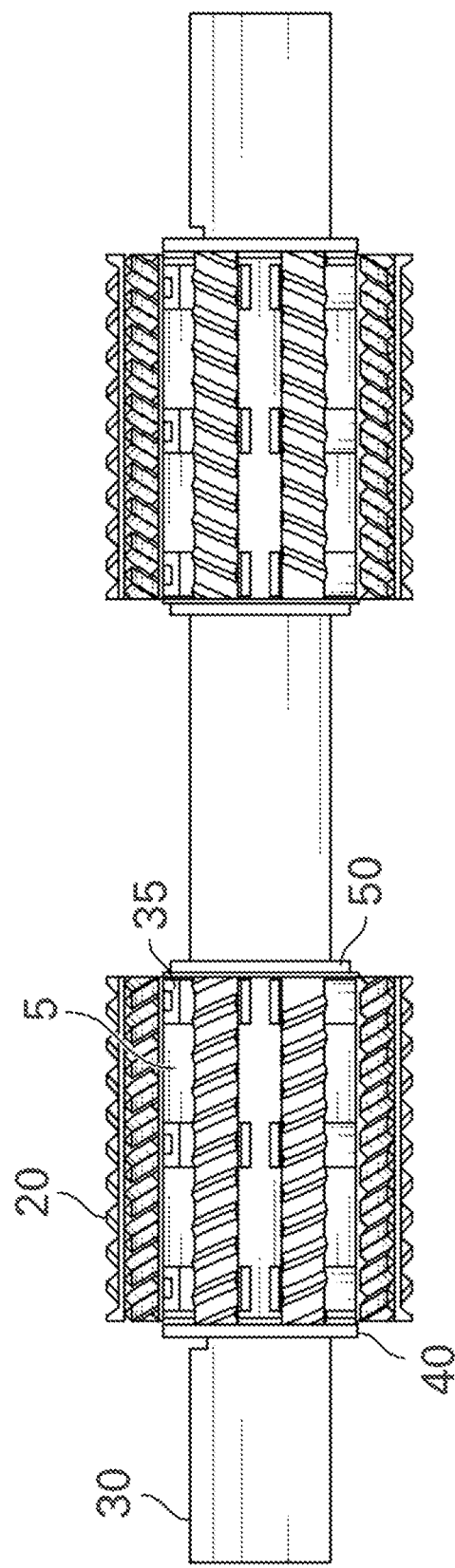
FIG. 7 depicts a longitudinal projection of an embodiment of the worm gear mechanism of the current disclosure.

Provided in FIG. 7 is a longitudinal projection of the mechanism of FIG. 4, with forming mandrel 25 removed for clarity. This embodiment contains two worm gear drives with thread segments oriented with opposite handedness. In this configuration, forward movement of the cannular assembly along the mandrel is accomplished with antisense rotation of the two worm gears. In this manner, any torque applied from one worm gear mechanism is matched to an equal and opposite extend from the other worm gear mechanism, thereby minimizing the tendency of the cannular assembly to rotate around the forming mandrel.

Figure 8:
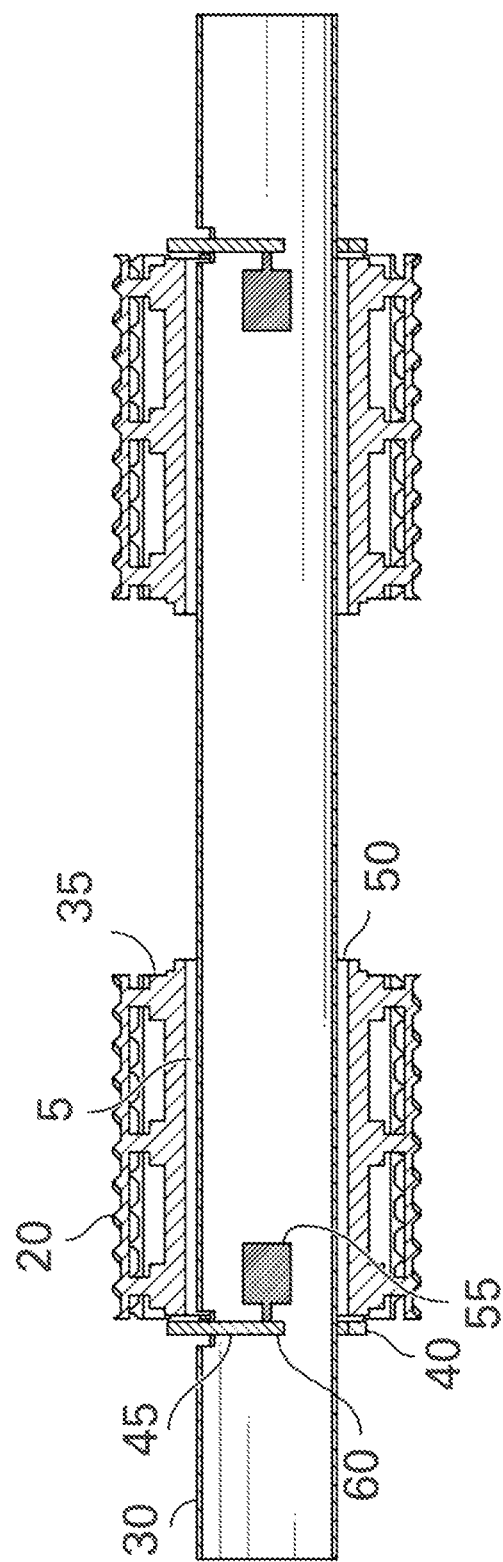
FIG. 8 depicts a longitudinal cross-section of an embodiment of the worm gear mechanism of the current disclosure.

Provided in FIG. 8 is the same projection as FIG. 7, with a cutaway to show the drive components. In this embodiment, motor 55 is located substantially at the centerline of the mechanism; other locations for motor 55, as well as alternative linkages between motor 55 and cylindrical drive wheel 5 are within the scope of the disclosure.

Figure 9:
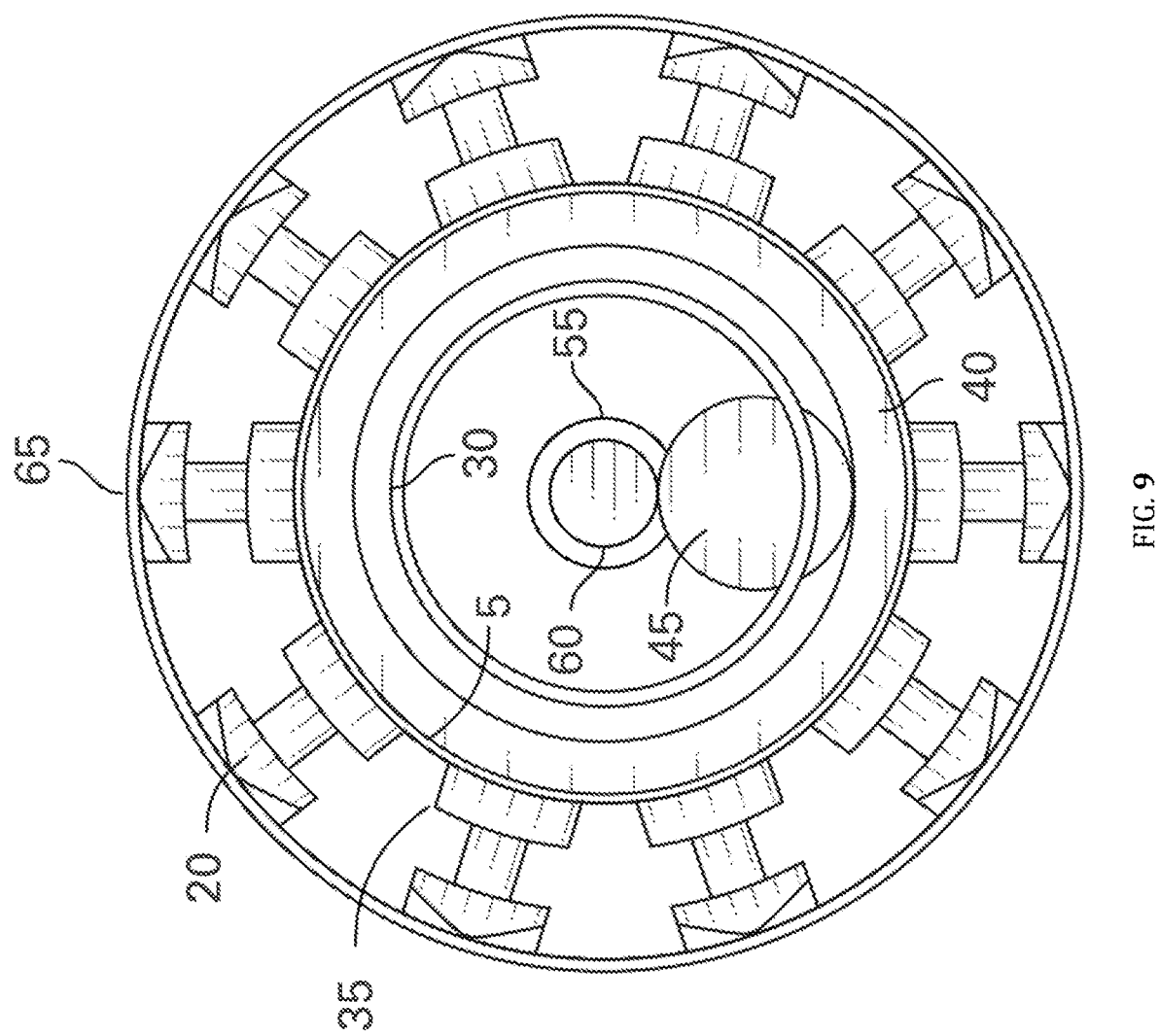
FIG. 9 depicts a transverse cross-section of and embodiment of the worm gear mechanism of the current disclosure in extended configuration.

Depicted in FIG. 9 is a transverse section of the mechanism of FIG. 4, with cylindrical sealing layer 65 included and with forming mandrel 25 removed. In this configuration, linear actuators 35 extend outward from cylindrical drive wheel 5, so that thread assemblies 20 make contact with sealing layer 65. The relative position of support pipe 30 and cylindrical drive wheel 5 is determined by the geared contact between toothed ring 40 and drive gear 45. Some embodiments may contain additional drive gears, at other positions on the circumference. Some embodiments may further contain one or more nonpowered bearings to further support cylindrical drive wheel 5 on support pipe 30.

Figure 10:
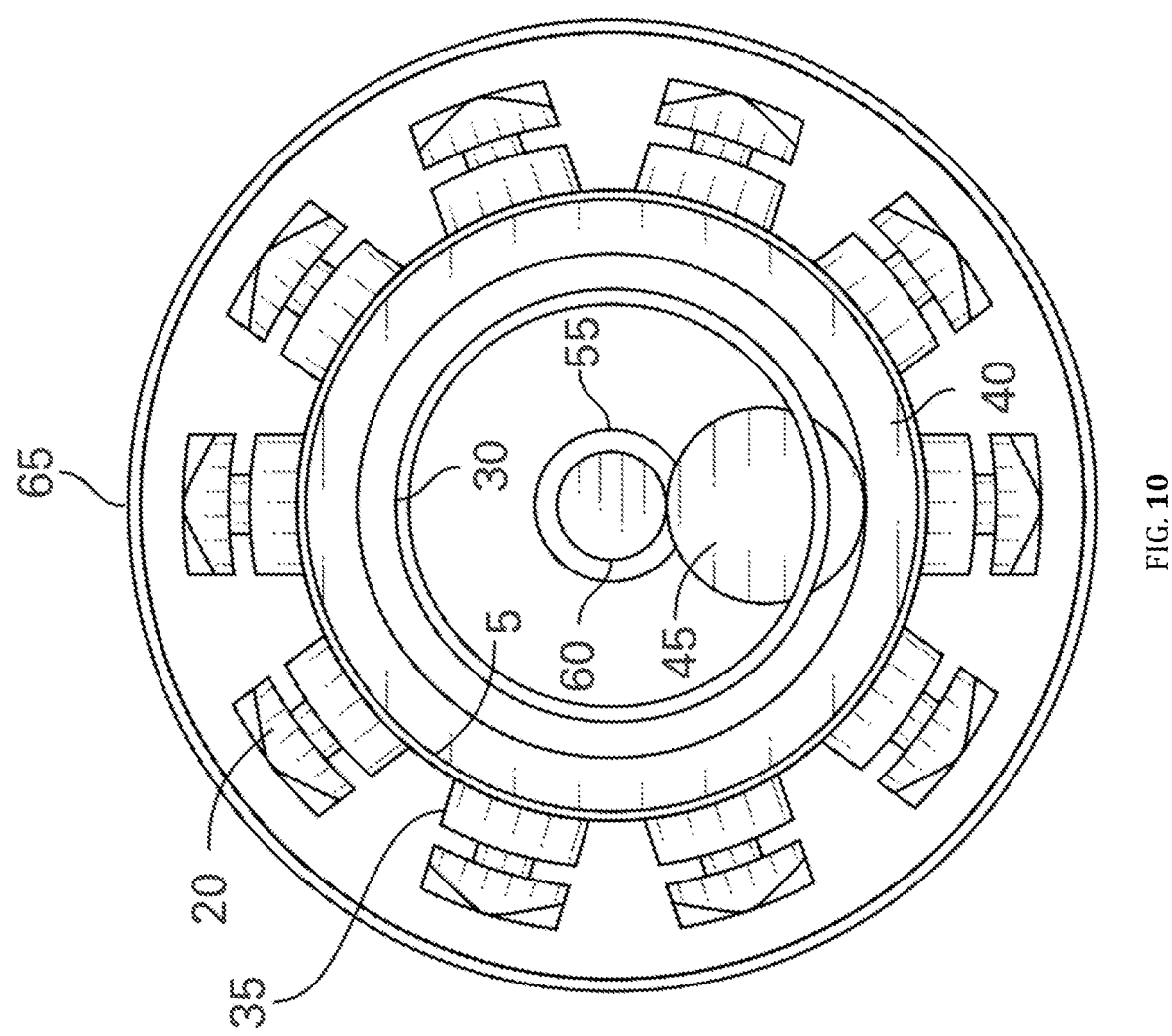
FIG. 10 depicts a transverse cross-section of and embodiment of the worm gear mechanism of the current disclosure in retracted configuration.

Provided in FIG. 10 is the same transverse section as FIG. 8. In this configuration, linear actuators 35 have been retracted inward from cylindrical drive wheel 5, so that thread assemblies 20 are withdrawn from contact with sealing layer 65. In some embodiments, intermediate configurations between those shown in FIGS. 9 and 10 can be provided by the linear actuators.

Internal Diameter Drive

In an alternate embodiment, an internal diameter drive ("IDD") wheeled drive mechanism. The drive wheels in this embodiment are oriented perpendicular to the centerline of the forming mandrel. The IDD mechanism and the drive wheels attached to the IDD mechanism are located between cylindrical spans of the forming mandrel, or within the forming mandrel. In contrast to the worm drive mechanism, the drive wheels of the IDD mechanism do not rotate around the entire circumference of the mandrel, and therefore cut-outs of the mandrel can allow the drive wheels, interior to the mandrel, to contact the inner surface of the nascent TCS, external to the mandrel.

In some embodiments, the axis of each drive wheel is offset from the centerline of the mandrel. Stated differently, in these embodiments, the axis is not coplanar to the centerline of the mandrel.

In contrast to the worm gear mechanism, the tread of the IDD drive can be chosen so as to provide optimal grip and minimal slippage with the internal surface of the nascent TCS.

Depending on the relative sizes of the internal circumference of the nascent TCS and the dimensions of the drive wheels of the IDD drive, the external surface of a simple cylindrical drive wheel may be employed as a tread. However, this arrangement may not provide adequate contact from the drive wheel, and may further induce distortions in the TCS from the ideal circular shape. Therefore, in some embodiments, the drive wheels are provided with beveled exterior surfaces, on which the tread is located. The geometry of this design will provide improved contact. In some embodiments, the material of the beveled treads is compressible, thereby optimizing contact between the drive wheels and the TCS interior.

Figure 11:
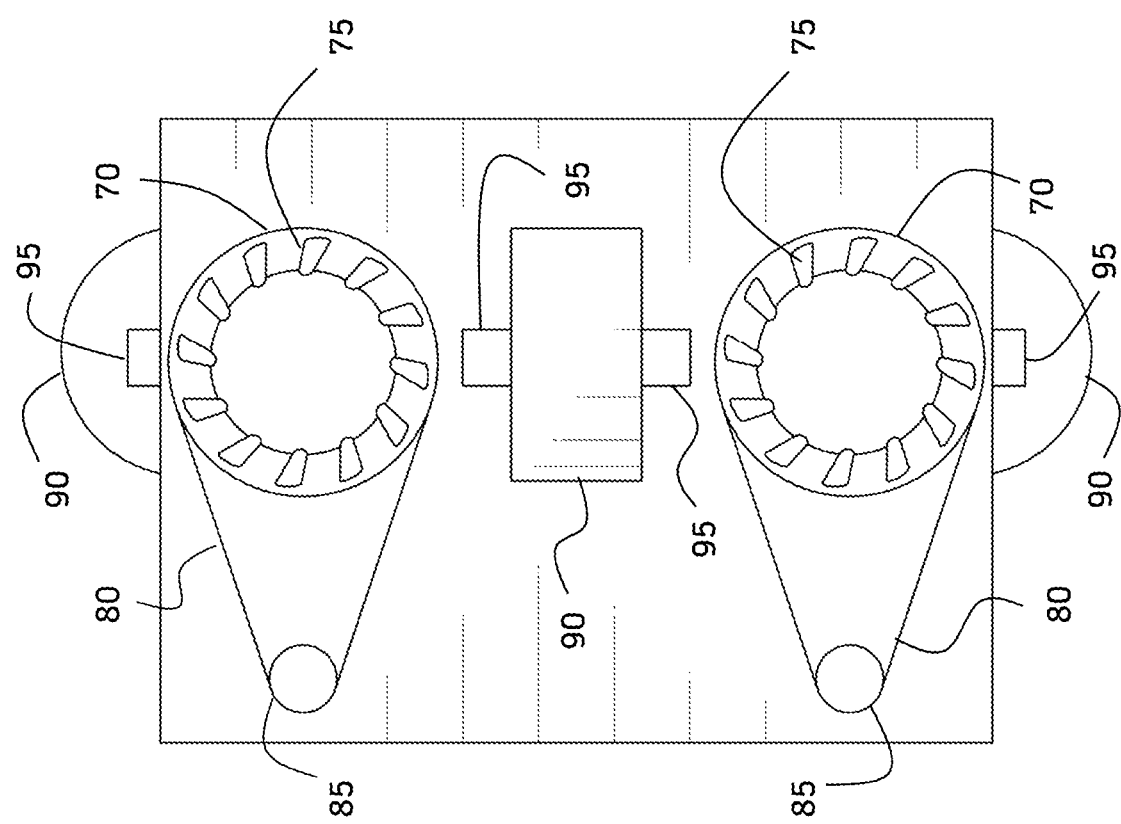
FIG. 11 depicts a side view of the IDD assembly.

Provided in FIG. 11 is a side view of the IDD assembly. Perpendicular drive wheels 70 with beveled treads 75 extend laterally from the assembly body. In this embodiment, drive wheels 70 are powered by chains 80 linked to motor shafts 85. Also depicted in this projection are freely rotating guide wheels 90 mounted on supports 95, extending vertically and laterally from the IDD assembly, and positioned between the two drive wheels 70. Guide wheels serve an important role, in maintaining a circular profile to the nascent TCS being formed on the exterior of the one or more drive wheels. In the absence of the guide wheels, the forces (both normal and frictional) applied by the one or more drive wheels to the TCS would tend to introduce unwanted ovality in the TCS.

Figure 12:
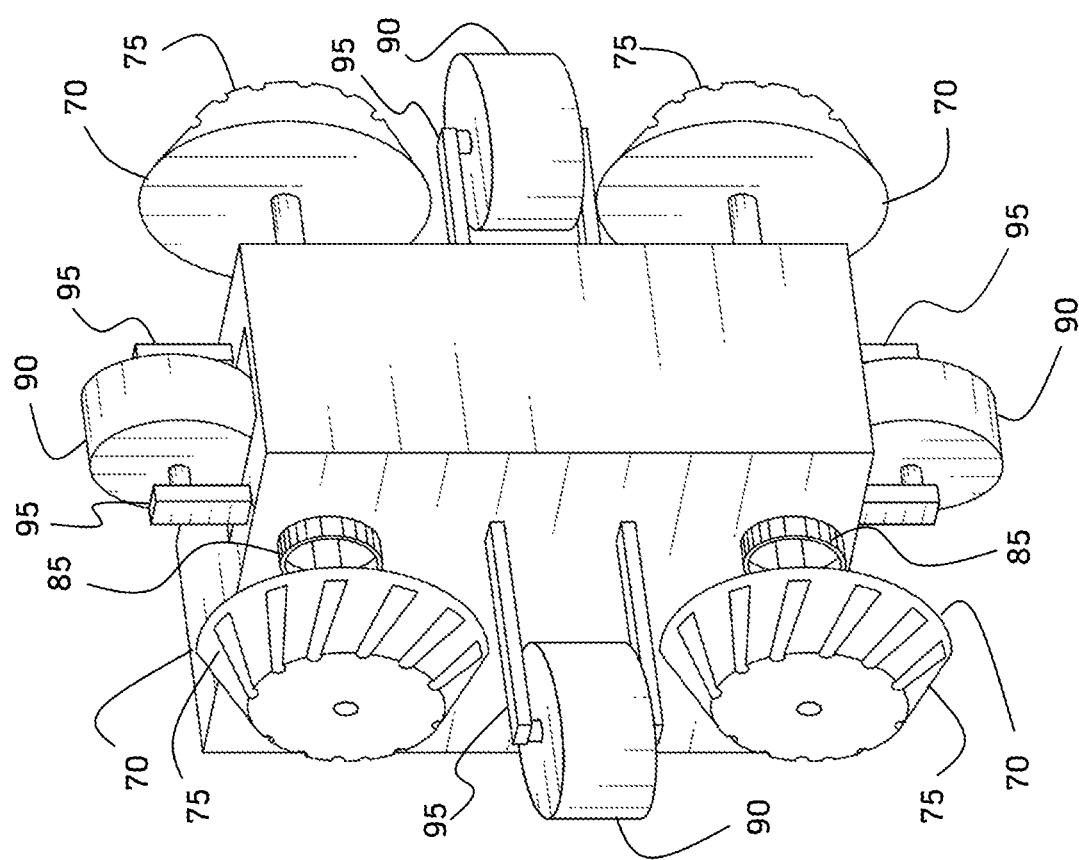
FIG. 12 depicts a perspective of the IDD assembly.

Provided in FIG. 12 is a perspective of the IDD assembly. Perpendicular rive wheels 70 with beveled treads 75 extend laterally from the assembly body, which preferably contains motors and wiring (both for power and for control). In some embodiments, the upper and lower pairs of drive wheels share the same drive shaft, and therefore turn at the same angular velocity. In some embodiments, each of the four drive wheels has an independent drive shaft, which may be advantageous in forming a curved TCS. Beveled treads 75 on drive wheels 70 approximate the internal circumference of the TCS. In some embodiments, the material of the beveled treads is compressible, thereby allowing the bevel to precisely adopt the curvature of the interior surface of the TCS, once frictional contact is initiated.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A wheeled drive mechanism for a forming mandrel comprising:
    one or more drive wheels substantially interior to the forming mandrel;
    one or more outward-facing treads attached to an exterior of the one or more drive wheels; and
    one or more rotation mechanisms, wherein:
        each of the one or more outward-facing treads is configured to contact an internal surface of a nascent tubular composite structure (TCS) on an exterior of the forming mandrel,
        the one or more rotation mechanisms are configured to rotate the one or more drive wheels relative to the forming mandrel, and
        rotation of the one or more drive wheels is configured to advance the nascent TCS along the exterior of forming mandrel.

2. The wheeled drive mechanism of claim 1, wherein at least one axis of each of the one or more drive wheels is concentric with an axis of the forming mandrel.

3. The wheeled drive mechanism of claim 1, wherein at least one of the one or more drive wheels is a cylindrical drive wheel concentric with an axis of the forming mandrel and interior to the forming mandrel.

4. The wheeled drive mechanism of claim 1, wherein each of the one or more rotation mechanisms comprises an electric motor.

5. The wheeled drive mechanism of claim 1, wherein each of the one or more rotation mechanisms comprises a stepper motor.

6. The wheeled drive mechanism of claim 1, further comprising one or more helical treads attached to the exterior of each of the one or more drive wheels.

7. The wheeled drive mechanism of claim 3, further comprising one or more thread assemblies attached to the exterior of the cylindrical drive wheel, each of the one or more thread assemblies comprising:
    a plurality of thread segments; and
    a mount attaching the plurality of thread segments to the cylindrical drive wheel.

8. The wheeled drive mechanism of claim 7, wherein the mount is configured to extend the plurality of thread segments radially outward from a center line of the forming mandrel, thereby contacting a tread on each of the thread segments of the plurality of thread segments with the internal surface the nascent TCS on the exterior of the forming mandrel.

9. The wheeled drive mechanism of claim 7, wherein the plurality of thread segments of each of the one or more thread assemblies is located around a circumference a of the cylindrical drive wheel.

10. The wheeled drive mechanism of claim 7, wherein the thread segments of the plurality of thread segments are arranged in a helical pattern on the at least one of the one or more drive wheels.

11. The wheeled drive mechanism of claim 1, wherein axes of at least one of the one or more drive wheels are perpendicular to an axis of the forming mandrel.

12. The wheeled drive mechanism of claim 11, wherein the at least one of the one or more drive wheels having axes perpendicular to the forming mandrel comprises an outward-facing tread attached to the exterior thereof.

13. The wheeled drive mechanism of claim 12, wherein each of the one or more rotation mechanisms comprises an electric motor.

14. The wheeled drive mechanism of claim 12, wherein each of the one or more rotation mechanisms comprises a stepper motor.

15. The wheeled drive mechanism of claim 11, wherein each of the at least one of the one or more drive wheels having axes perpendicular to the forming mandrel has a bevel on an outward-facing surface.

16. The wheeled drive mechanism of claim 15, wherein the bevel comprises a tread of compressible material, oriented so as to contact an interior surface of the nascent TCS.

17. The wheeled drive mechanism of claim 16, wherein frictional engagement of the interior surface of the nascent TCS with the tread on the bevel conforms the compressible material to the interior surface of the nascent TCS.

18. The wheeled drive mechanism of claim 1, further comprising two driveshafts, an axis of each driveshaft is being oriented perpendicular to the forming mandrel, and wherein each driveshaft comprises a drive wheel mounted on each end thereof.

19. The wheeled drive mechanism of claim 18, further comprising a single rotation mechanism configured to rotate both driveshafts, thereby rotating the drive wheels mounted on each end of each drive shaft relative to the forming mandrel.

20. The wheeled drive mechanism of claim 18, further comprising two rotation mechanisms, each configured to rotate one of the two driveshafts, thereby rotating the drive wheels mounted on each end of each driveshaft relative to the forming mandrel.

21. The wheeled drive mechanism of claim 1, further comprising four driveshafts arranged as two collinear pairs, each driveshaft oriented perpendicular to the forming mandrel, and wherein an additional drive wheel having an outward facing tread is mounted on an external end of each driveshaft.

22. The wheeled drive mechanism of claim 21, further comprising four rotation mechanisms, each configured to rotate one of the four driveshafts, thereby rotating each additional drive wheel relative to the forming mandrel.

23. The wheeled drive mechanism of claim 1, further comprising one or more guide wheels, an axis of each of which is located perpendicular to the forming mandrel, and each of which is oriented so as to contact the internal surface of the nascent TCS on the exterior of the forming mandrel.

24. The wheeled drive mechanism of claim 23, wherein each of the one or more guide wheels is radius-matched with the internal surface of the nascent TCS.

25. The wheeled drive mechanism of claim 23, wherein each of the one or more guide wheels is located approximately equidistant along a circumference of the forming mandrel from two of the one or more drive wheels.

26. A mobile onsite factory (MOF) for fabrication of a tubular composite structure (TCS), comprising:
    a forming mandrel; and
    a wheeled drive mechanism for the forming mandrel comprising:
        one or more drive wheels substantially interior to the forming mandrel,
        one or more outward-facing treads attached to an exterior of the one or more drive wheels, and
        one or more rotation mechanisms, wherein:
            each of the one or more outward-facing treads is configured to contact an internal surface of a nascent TCS on an exterior of the forming mandrel, the one or more rotation mechanisms are configured to rotate the one or more drive wheels relative to the forming mandrel, and rotation of the one or more drive wheels is configured to advance the nascent TCS along the exterior of forming mandrel.

27. The MOF claim 26, wherein at least one axis of each of the one or more drive wheels is concentric with an axis of the forming mandrel.

28. The MOF of claim 27, wherein at least one of the one or more drive wheels is a cylindrical drive wheel concentric with an axis of the forming mandrel and interior to the forming mandrel.

29. The MOF of claim 28, further comprising one or more thread assemblies attached to the exterior of the cylindrical drive wheel, each of the one or more thread assemblies comprising:
   a plurality of thread segments, and
   a mount attaching the plurality of thread segments to the cylindrical drive wheel.

30. The MOF of claim 29, wherein the mount is configured to extend the plurality of thread segments radially outward from a centerline of the forming mandrel, thereby contacting a tread on each of the thread segments of the plurality of thread segments with the internal surface the nascent TCS on the exterior of the forming mandrel.

31. The MOF of claim 26, wherein axes of at least one of the one or more drive wheels are perpendicular to an axis of the forming mandrel.

32. The MOF of claim 31,
   wherein the at least one of the one or more drive wheels having axes perpendicular to the forming mandrel comprises an outward-facing tread attached to the exterior thereof.

33. The MOF of claim 32, wherein:
   each of the at least one of the one or more drive wheels having axes perpendicular to the forming mandrel has a bevel on an outward-facing surface,
   the bevel comprises a tread of compressible material, oriented so as to contact an interior surface of the nascent TCS, and
   frictional engagement of the interior surface of the nascent TCS with the tread on the bevel conforms the compressible material to the interior surface of the nascent TCS.

34. The MOF of claim 26, wherein the wheeled drive mechanism further comprises one or more guide wheels, an axis of each of which is located perpendicular to the forming mandrel, and each of which is oriented so as to contact the internal surface the nascent TCS on the exterior of the forming mandrel.

35. A method for manufacturing a cannular assembly, the method comprising:
   providing a mechanical forming mandrel having a fixed upstream end and a cantilevered downstream end;
   providing a wheeled drive mechanism comprising:
      one or more drive wheels substantially interior to the mechanical forming mandrel;
      one or more outward-facing treads attached to an exterior of the one or more drive wheels; and
      one or more rotation mechanisms, wherein:
         each of the one or more outward facing treads is configured to contact an internal surface of a nascent tubular composite structure (TCS) on an exterior of the mechanical forming mandrel,
         the one or more rotation mechanisms are configured to rotate the one or more drive wheels relative to the mechanical forming mandrel, and
         rotation of the one or more drive wheels is configured to advance the nascent TCS along the exterior of mechanical forming mandrel;
   forming a first circular leading end of a first cylindrical layer from a first feedstock on a surface of the mechanical forming mandrel at a first location near the fixed upstream end;
   rotating the one or more drive wheels of the wheeled drive mechanism, thereby advancing the first circular leading end towards the cantilevered downstream end;
   fabricating a growing first cylindrical layer from a feedstock on the surface of the mechanical forming mandrel behind the first circular leading end, the first cylindrical layer thereby advancing with the first circular leading end towards the cantilevered downstream end and becoming an outermost layer of a growing cannular assembly;
   performing one or more iterations of;
      forming a new circular leading end of a new cylindrical layer from a new feedstock, which is one of the same or different from other feedstocks, on an outer surface of an advancing outermost layer of an incomplete cannular assembly at a downstream location, an existing outermost layer thereby becoming an inner layer of the growing cannular assembly; and
      fabricating a growing new cylindrical layer from the new feedstock on the outer surface of the outermost layer behind the new circular leading end, the growing new cylindrical layer thereby advancing with the inner layers towards the cantilevered downstream end and becoming a new outermost layer of the growing cannular assembly;
   severing, as needed, the growing cannular assembly from the feedstocks; and
   separating a completed cannular assembly from the cantilevered downstream end, thereby providing the cannular assembly.

36. A method for manufacturing a cannular assembly, the method comprising:
   providing a mechanical forming mandrel having a fixed upstream end and a cantilevered downstream end;
   providing a wheeled drive mechanism comprising:
      one or more drive wheels substantially interior to the mechanical forming mandrel, wherein at least one of the one or more drive wheels is a cylindrical drive wheel concentric with an axis of the mechanical forming mandrel and interior to the mechanical forming mandrel;
      one or more outward-facing treads attached to an exterior of the one or more drive wheels; and
      one or more rotation mechanisms, wherein:
         each of the one or more outward-facing treads is configured to contact an internal surface of a nascent tubular composite structure (TCS) on an exterior of the mechanical forming mandrel,
         the one or more rotation mechanisms are configured to rotate the one or more drive wheels relative to the mechanical forming mandrel, and
         rotation of the one or more drive wheels is configured to advance the nascent TCS along the exterior of mechanical forming mandrel;

forming a first circular leading end of a first cylindrical layer from a first feedstock on a surface of the mechanical forming mandrel at a first location near the fixed upstream end;

rotating the one or more drive wheels of the wheeled drive mechanism, thereby advancing the first circular leading end towards the cantilevered downstream end;

fabricating a growing first cylindrical layer from a feedstock on the surface of the mechanical forming mandrel behind the first circular leading end, the first cylindrical layer thereby advancing with the first circular leading end towards the cantilevered downstream end and becoming an outermost layer of a growing cannular assembly;

performing one or more iterations of;
- forming a new circular leading end of a new cylindrical layer from a new feedstock, which is one of the same or different from other feedstocks, on an outer surface of an advancing outermost layer of an incomplete cannular assembly at a downstream location, an existing outermost layer thereby becoming an inner layer of the growing cannular assembly; and
- fabricating a growing new cylindrical layer from the new feedstock on the outer surface of the outermost layer behind the new circular leading end, the growing new cylindrical layer thereby advancing with the inner layers towards the cantilevered downstream end and becoming a new outermost layer of the growing cannular assembly;

severing, as needed, the growing cannular assembly from the feedstocks; and separating a completed cannular assembly from the cantilevered downstream end, thereby providing the cannular assembly.

37. A method for manufacturing a cannular assembly, the method comprising:

providing a mechanical forming mandrel having a fixed upstream end and a cantilevered downstream end;

providing a wheeled drive mechanism comprising:
- one or more drive wheels substantially interior to the mechanical forming mandrel, wherein axes of at least one of the one or more drive wheels are perpendicular to an axis of the mechanical forming mandrel, and wherein the at least one of the one or more drive wheels having axes perpendicular to the mechanical forming mandrel comprises an outward-facing tread attached to an exterior thereof;
- one or more outward-facing treads attached to an exterior of the one or more drive wheels; and
- one or more rotation mechanisms, wherein:
  - each of the one or more outward facing treads is configured to contact an internal surface of a nascent tubular composite structure (TCS) on an exterior of the mechanical forming mandrel,
  - the one or more rotation mechanisms are configured to rotate the one or more drive wheels relative to the mechanical forming mandrel, and
  - rotation of the one or more drive wheels is configured to advance the nascent TCS along the exterior of mechanical forming mandrel;

forming a first circular leading end of a first cylindrical layer from a first feedstock on a surface of the mechanical forming mandrel at a first location near the fixed upstream end;

rotating the one or more drive wheels of the wheeled drive mechanism, thereby advancing the first circular leading end towards the cantilevered downstream end;

fabricating a growing first cylindrical layer from a feedstock on the surface of the mechanical forming mandrel behind the first circular leading end, the first cylindrical layer thereby advancing with the first circular leading end towards the cantilevered downstream end and becoming an outermost layer of a growing cannular assembly;

performing one or more iterations of;
- forming a new circular leading end of a new cylindrical layer from a new feedstock, which is one of the same or different from other feedstocks, on an outer surface of an advancing outermost layer of an incomplete cannular assembly at a downstream location, existing outermost layer thereby becoming an inner layer of the growing cannular assembly; and
- fabricating a growing new cylindrical layer from the new feedstock on the outer surface of the outermost layer behind the new circular leading end, the growing new cylindrical layer thereby advancing with the inner layers towards the cantilevered downstream end and becoming a new outermost layer of the growing cannular assembly;

severing, as needed, the growing cannular assembly from the feedstocks; and separating a completed cannular assembly from the cantilevered downstream end, thereby providing the cannular assembly.

* * * * *